(12) United States Patent
Colbeck et al.

(10) Patent No.: US 6,924,990 B2
(45) Date of Patent: Aug. 2, 2005

(54) POWER SUPPLY ARRANGEMENTS

(75) Inventors: Roger Peter Colbeck, Stittsville (CA); Rajko Duvnjak, Kanata (CA)

(73) Assignee: Potentia Semiconductor, Inc., Wilmington, DE (US)

( * ) Notice: Subject to any disclaimer, the term of this patent is extended or adjusted under 35 U.S.C. 154(b) by 93 days.

(21) Appl. No.: 10/428,099

(22) Filed: May 2, 2003

(65) Prior Publication Data

US 2004/0218408 A1 Nov. 4, 2004

(51) Int. Cl.$^7$ ............................................. H02M 3/335
(52) U.S. Cl. ............................ 363/16; 363/49; 323/901
(58) Field of Search ................................ 363/16, 21.01, 363/21.02, 21.12, 21.15, 21.17, 49; 323/901; 327/545

(56) References Cited

U.S. PATENT DOCUMENTS

| | | | |
|---|---|---|---|
| 4,864,485 A | | 9/1989 | Rilly et al. ..................... 363/49 |
| 5,132,890 A | * | 7/1992 | Blandino .................. 363/21.02 |
| 5,530,398 A | * | 6/1996 | Shamlou et al. ............. 327/545 |
| 5,610,803 A | | 3/1997 | Malik .......................... 363/21 |

FOREIGN PATENT DOCUMENTS

| | | | |
|---|---|---|---|
| EP | 0676857 | 10/1995 | ............ H02M/3/07 |
| JP | 04226602 | 8/1992 | ............ H02M/7/48 |

* cited by examiner

Primary Examiner—Jessica Han

(57) ABSTRACT

A switch mode power supply and its start-up circuit produce a controlled output voltage from an input voltage. A power supply control circuit is powered by the output voltage and is responsive to the output voltage to control the power supply. The control circuit responds to differences between a fraction of the output voltage and a reference voltage to control the start-up circuit. This control is inhibited at low values of the output voltage to ensure that the power supply starts up correctly despite the reference voltage being indefinite or unstable at such low values of the output voltage.

16 Claims, 2 Drawing Sheets

POWER SUPPLY ARRANGEMENTS

REFERENCE TO RELATED APPLICATION

Reference is directed to the following copending U.S. patent application filed simultaneously herewith, the entire disclosure of which is hereby incorporated herein by reference:

"Reset Circuits", R. Colbeck et al.

This invention relates to power supply arrangements, and is particularly concerned with a power supply arrangement comprising a power supply, responsive to an input voltage for producing a controlled output voltage, including a control circuit which is powered by the output voltage of the power supply. The term "power supply" is used herein to include switch mode power supplies, DC converters, voltage regulators, and other circuits for producing a controlled output voltage from an input voltage.

BACKGROUND

It is well known to provide a power supply arrangement which includes a power supply, such as a DC converter or switch mode power supply (SMPS), which is responsive to an input voltage to produce a controlled output voltage for example for powering electronic circuits. Such a power supply typically includes a control circuit which compares a fraction of the output voltage with a reference voltage, the result of the comparison being used in a control loop to control or regulate the output voltage.

In such a power supply arrangement the control circuit includes active components, such as a comparator and a source of the reference voltage, a supply voltage for which is derived from the input voltage. Alternatively, it may be desirable for the control circuit to be powered by the output voltage of the power supply.

For example, the related application describes a power supply controller including a power supply for a control unit of the power supply controller which conveniently can comprise an ASIC (application-specific IC or integrated circuit). The power supply includes its own control unit, parts of which are conveniently incorporated into the ASIC. The ASIC is powered by the output voltage of the power supply, so that the control unit of the power supply is powered by the output voltage of the power supply. In this case for example the output voltage of the power supply may be 3.3 volts and the input voltage may be 48 volts, so that the input voltage is much greater than the output voltage.

On start-up of such a power supply arrangement, when the input voltage is initially connected so that it rises from zero volts to its normal value of for example 48 volts, it is possible for the power supply to fail to start up, or to start up in a manner that can produce an incorrect output voltage. These undesirable results can arise in particular as a result of indefinite or undefined characteristics of a reference voltage source of the control unit at very small values of the output voltage of the power supply powering these components.

Accordingly, there is a need to provide a power supply arrangement in which such undesirable results are avoided.

SUMMARY OF THE INVENTION

According to one aspect of this invention there is provided a power supply arrangement comprising a power supply responsive to an input voltage for producing a controlled output voltage, the power supply including a control circuit powered by the output voltage of the power supply and responsive to differences between a voltage dependent upon the output voltage of the power supply and a reference voltage to control the power supply, wherein the control circuit is initially responsive to start-up of the power supply arrangement to inhibit said control.

The control circuit preferably comprises a difference amplifier having an output for controlling the power supply to control said output voltage, the difference amplifier further having an input for disabling operation of the difference amplifier in dependence upon said output voltage of the power supply.

The control circuit can further comprise a diode arranged to be forward biassed via a resistance coupled to said output voltage, and a logic element responsive to a forward voltage drop of the diode to control said input for disabling operation of the difference amplifier. The logic element can comprise an inverter to which said output voltage is provided as a supply voltage.

The power supply preferably comprises a switch mode power supply having a start-up circuit for producing said output of the power supply prior to operation of the switch mode power supply, wherein the control circuit controls the start-up circuit and is initially responsive to start-up of the power supply arrangement to inhibit control of the start-up circuit. Conveniently, the start-up circuit comprises a transistor controlled by the control circuit and providing a controlled path between the input voltage and the output voltage of the power supply. Preferably the control circuit is responsive to operation of the switch mode power supply to turn off the transistor of the start-up circuit.

Another aspect of the invention provides a power supply arrangement comprising: a switch mode power supply for producing a controlled output voltage from an input voltage; a control circuit powered by the output voltage and responsive to the output voltage to control the switch mode power supply; and a start-up circuit for producing said output voltage from the input voltage on start-up prior to operation of the switch mode power supply; wherein the control circuit comprises an amplifier responsive to differences between a voltage dependent upon the output voltage of the power supply and a reference voltage to produce an output for controlling the start-up circuit, and an inhibit circuit for inhibiting operation of the amplifier at low values of said output voltage.

The control circuit can comprise a bandgap voltage reference source powered by said output voltage of the power supply for providing the reference voltage.

The inhibit circuit can comprise a diode, a resistance via which the diode is forward biassed from said output voltage, and a logic element responsive to a forward voltage drop of the diode, relative to an input threshold voltage of the logic element which is dependent upon said output voltage, to inhibit operation of the amplifier at low values of said output voltage. For example the logic element can comprise an inverter to which said output voltage is provided as a supply voltage.

The start-up circuit can comprise a transistor controlled by the control circuit and providing a controlled path between the input voltage and the output voltage of the power supply, and the control circuit is preferably arranged to control the switch mode power supply to produce a higher value of said output voltage than is produced by the start-up circuit and to turn off the transistor of the start-up circuit in response to said higher value of said output voltage.

The invention also provides, in combination, a power supply arrangement as recited above and an electrical circuit powered by the output voltage of the power supply, wherein the electrical circuit comprises an integrated circuit and at least part of the control circuit of the power supply is included in said integrated circuit.

BRIEF DESCRIPTION OF THE DRAWINGS

The invention will be further understood from the following description by way of example with reference to the accompanying drawings, in which.

DETAILED DESCRIPTION

Figure 1:
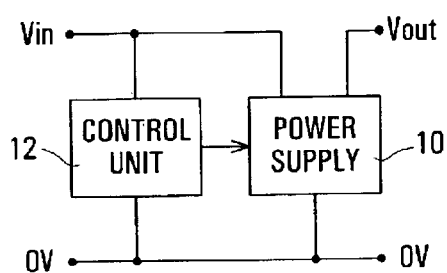
FIG. 1 shows a block diagram of a conventional power supply arrangement.

Referring to FIG. 1, a conventional power supply arrangement is illustrated as comprising a power supply 10 which is supplied with an input voltage Vin and produces an output voltage Vout, relative to a zero voltage 0V. The power supply 10 includes a control unit 12, which for clarity is illustrated as a separate block, which serves to monitor the output voltage Vout of the power supply 10, via a connection path which is not shown in FIG. 1, and to control the power supply 10 accordingly, for example to regulate the output voltage Vout in a desired manner. To this end the control unit 12 includes at least one active component, for example a voltage comparator, which is supplied with an operating voltage derived directly from the input voltage Vin as shown in FIG. 1.

Figure 2:
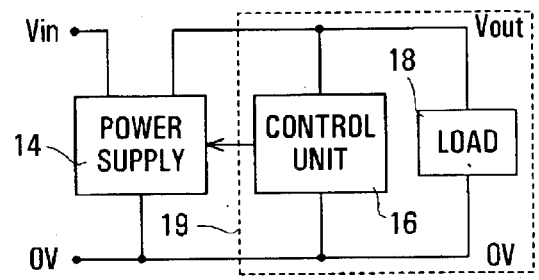
FIG. 2 shows a block diagram of a power supply arrangement and load in accordance with an embodiment of this invention.

FIG. 2 shows a block diagram of a power supply arrangement and load in accordance with an embodiment of this invention. The power supply arrangement of FIG. 2 comprises a power supply 14 which again is supplied with an input voltage Vin and produces an output voltage Vout, relative to a zero voltage 0V. The power supply 14 includes a control unit 16, which for clarity is illustrated as a separate block, which serves to monitor the output voltage Vout of the power supply 14 and to control the power supply 14 accordingly, for example to regulate the output voltage Vout in a desired manner. The control unit 16 includes at least one active component, for example a voltage comparator or differential amplifier, which is supplied with an operating voltage which in this case is derived from the output voltage Vout of the power supply 14.

In FIG. 2, an electrical circuit which is powered by the power supply 10 is also represented by a load 18, connected to the output voltage Vout of the power supply 10 and to the 0V path. In an embodiment of the invention, the load 18 includes, or may be constituted entirely by, an integrated circuit (IC) such as an ASIC (application-specific IC), represented by a dashed-line box 19 in FIG. 2, which also incorporates all or part of the control unit 16 as shown in FIG. 2. This facilitates providing the combination of the power supply arrangement with the load 18, because components of the control unit 16 can be incorporated into the ASIC and do not need to be provided separately.

As described below, other components of the power supply 14 typically include capacitors, a transformer, and semiconductor devices that must withstand the input voltage Vin that may be relatively high, so that these components are not suited to being included in the IC; however, some components of the power supply 14 other than the control unit 16 may also be incorporated into the IC.

Although FIGS. 1 and 2 illustrate non-isolated power supply arrangements in which for example the 0V path is common to the input and output, this need not be the case and the invention also applies to isolated power supply arrangements.

Figure 3:
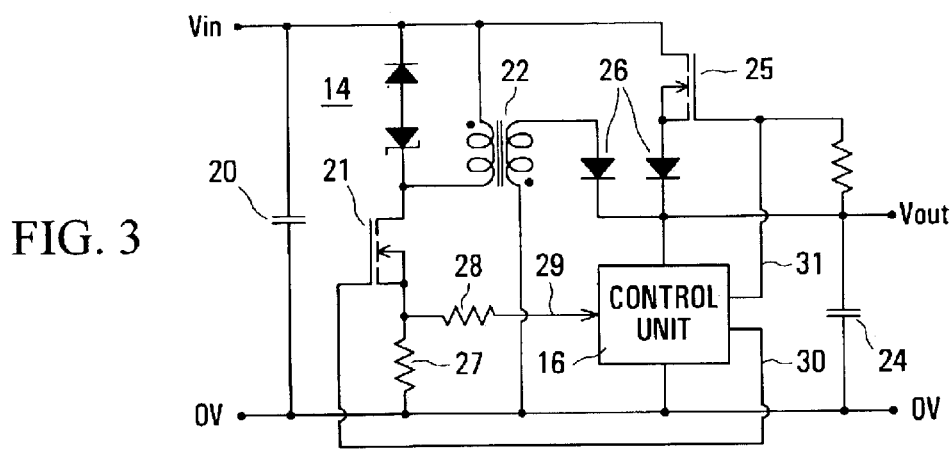
FIG. 3 schematically illustrates in greater detail one form of the power supply arrangement of FIG. 2.

FIG. 3 illustrates in greater detail one form of the power supply arrangement of FIG. 2, in which the power supply 14 is constituted by a current mode flyback converter to provide sufficient power to the load 18, with a start-up circuit including a depletion mode MOSFET. By way of example, the input voltage Vin may be nominally 48 volts, and the output voltage Vout may be nominally 3.3 volts.

Referring to FIG. 3, the current mode flyback converter includes the control unit 16 shown as a block, an input capacitor 20, a switching transistor 21, a transformer 22, and an output capacitor 24. The start-up circuit comprises a depletion mode MOSFET 25, the output voltage of nominally 3.3 volts being derived from either the start-up circuit or the flyback converter via a respective one of two diodes 26. A resistor 27 in the source circuit of the switching transistor 21 provides current sensing to produce a control voltage which is coupled via a resistor 28 to an input 29 of the control unit 16. The control unit 16 also has an output 30 coupled to the gate of the switching transistor 21 for controlling this transistor, and another output 31 for turning off the depletion mode transistor 25 when the flyback converter is operating.

Although FIG. 3 illustrates a current mode flyback converter with a start-up circuit, it can be appreciated that the power supply 14 can have any other desired form. It will be appreciated that where, as in FIG. 3, the power supply 14 is a switch mode power supply (SMPS) requiring the control unit 16 to provide a pulsed signal for operation of the SMPS, a start-up circuit, such as that provided by the depletion mode MOSFET 25, provides an initial supply voltage to the control unit 16 to enable it to produce this pulsed signal. However, the invention is not limited to the provision of a start-up circuit; for example (with different input and/or output voltages for reasons of efficiency and power dissipation) the power supply 14 could instead comprise a linear regulator for which no separate start-up circuit may be required. In addition, other forms of start-up circuit may be used, for example comprising an enhancement mode MOSFET or a bipolar transistor.

Figure 4:
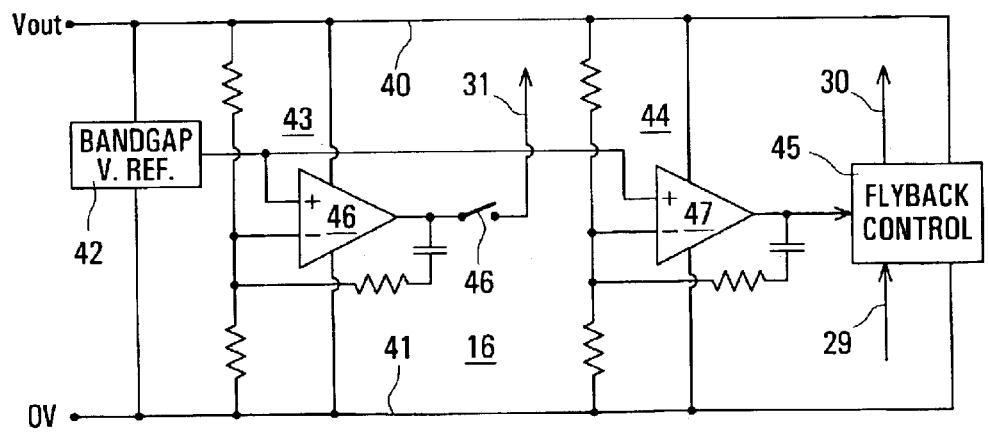
FIG. 4 schematically illustrates one form of parts of a control unit of the power supply arrangement of FIG. 3.

FIG. 4 illustrates one form of parts of the control unit 16 of the power supply arrangement of FIG. 3, with a supply voltage rail 40 to which the output voltage Vout of the power supply 14 is connected, and a 0V rail 41 connected to the 0V path of the power supply 14. Active circuits of the control unit 16 comprise a bandgap voltage reference source 42, two amplifier circuits 43 and 44, and a flyback control circuit 45, each of which is connected to the rails 40 and 41 to be powered by the output voltage Vout of the power supply 14.

As shown in FIG. 4, each of the amplifier circuits 43 and 44 comprises an operational or differential amplifier, 46 and 47 respectively, having a non-inverting (+) input, to which a reference voltage output of the source 42 is supplied, and an inverting (−) input to which is connected a tapping point of a respective potential divider coupled between the rails 40 and 41. Each amplifier circuit also includes a feedback path, comprising a resistor connected in series with a capacitor, from the amplifier output to its inverting input.

The output of the differential amplifier 46 of the circuit 43 is illustrated in FIG. 4 as being coupled via a switch 46 to the line 31 for controlling the depletion mode MOSFET 25. The switch 46 in FIG. 4 diagrammatically represents any of a variety of ways in which a feedback loop via the circuit 43 is broken as described further below. For example, such a break can be provided by tri-stating (providing a high impedance at) the output of the differential amplifier 46 as described below, or otherwise controlling the differential amplifier 46 or its input or output signal(s) or circuit(s).

The output of the differential amplifier 47 of the circuit 44 is connected to an input of the flyback control circuit 45, another input of which is provided by the line 29 and an output of which is connected to the line 30 for controlling the switching transistor 21. The flyback control circuit can be provided in known manner and accordingly details of this are not given here.

On start-up of the power supply arrangement, the input voltage Vin initially rises from zero volts as capacitors, such as the capacitor 20 of the power supply 14, charge. Initially the depletion mode MOSFET is conductive to charge the capacitor 24 so that the output voltage Vout of the power supply 14 also rises from zero volts, this increasing voltage Vout providing a supply voltage to the control unit 16. The potential divider of the circuit 43 is selected, in relation to the reference voltage supplied by the source 42, so that as the input voltage Vin continues to rise this circuit 43, assuming that the switch 46 (i.e. the feedback path via the circuit 43) is closed, starts to turn off the depletion mode MOSFET 25 to maintain an output voltage of about 3.2 volts, just below the nominal output voltage of 3.3 volts.

At a higher value of the input voltage Vin, for example at an input voltage Vin of about 25 volts as monitored by a circuit not shown, the flyback control circuit 45 is enabled to drive the switching transistor 21 of the flyback converter of FIG. 3. The potential divider of the circuit 44 is selected, in relation to the reference voltage supplied by the source 42, so that the flyback converter increases the output voltage Vout to its nominal value of 3.3 volts and maintains it at this level. Consequently, the inverting input of the amplifier 46 of the circuit 43 becomes more positive, and with the switch 46 (feedback path) closed the circuit 43 fully turns off the depletion mode MOSFET 25, so that the power supply 14 then operates using only the more efficient flyback converter.

The switch 46, in whatever form it is implemented to selectively open the feedback path via the circuit 43, serves to inhibit control of the depletion mode MOSFET 25 during the initial part of the start-up process as described above, when the output voltage Vout is at a very low level of less than, for example, about 1 to 2 volts. At such low initial levels of the output voltage Vout, the operation of the bandgap voltage reference source 42 and/or the circuit 43 may be undefined and indefinite.

As a result, without this inhibit function it would be possible for the output of the circuit 43 to turn off the depletion mode MOSFET 25 prematurely. In this case either the power supply 14 may not start up at all, or the power supply 14 may start up with this circuit 43 determining an incorrect output voltage Vout, resulting in unpredictable operation of the load 18 powered by the power supply.

Accordingly, the inhibit function represented by the switch 46 is activated (equivalent to opening the switch 46) on start-up of the power supply until the output voltage Vout reaches a value, for example about 1.8 volts as described below, at which stable and defined operation of the bandgap voltage reference source 42 and the circuit 43 is ensured.

Alternatively, or in addition, it can be appreciated that the inhibit function represented by the switch 46 can be activated for a predetermined time to ensure that the output voltage Vout of the power supply 14, provided by conduction of the depletion mode MOSFET 25, has risen to a sufficient level for stable operation of these active components of the control unit 16. However, such an alternative arrangement may also require additional measures to be taken to limit the output voltage Vout to about its nominal value during the time the inhibit function is effective, i.e. before the circuit 43 operates to control the MOSFET 25.

The inhibit function of the switch 46 is preferably provided by tri-stating the output of the amplifier 46 of the circuit 43, i.e. switching this output to a high impedance state. This is conveniently achieved using an arrangement of the form shown in FIG. 5.

Figure 5:
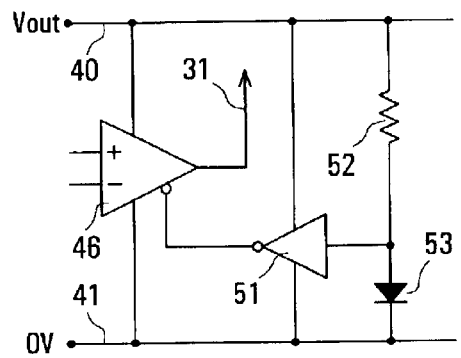
FIG. 5 schematically illustrates a particular form of part of the control unit of FIG. 4.

FIG. 5 shows the differential amplifier 46 of the circuit 43 in the control unit 16 of FIG. 4, connected to the rails 40 and 41 and providing its output to the line 31 for controlling the depletion mode MOSFET 25. For clarity, the input and feedback connections of the amplifier 46 are not shown in FIG. 5 but can be the same as shown in FIG. 4. The amplifier 46 also has an active low output enable input, which is connected to an output of an inverter 51 also connected to the rails 40 and 41 to be powered by the power supply output voltage Vout. An input of the inverter 51 is connected via a resistance 52 to the rail 40 and via a diode 53, poled to be forward biassed, to the rail 41.

Figure 6:
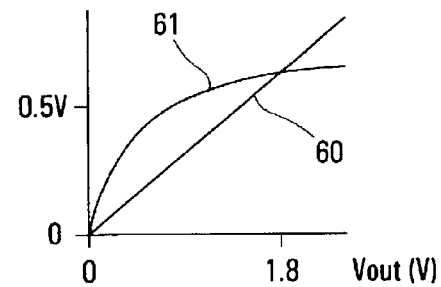
FIG. 6 is a graph illustrating operation of part of the control unit as shown in FIG. 5.

FIG. 6 is a graph illustrating operation of the inverter 51. In FIG. 6, a line 60 represents a linear dependence of the input logic threshold level of the inverter 51 on its supply voltage Vout, and a line 61 represents a non-linear dependence of the forward voltage drop of the diode 53 on this voltage Vout. As the voltage Vout increases towards about 2 volts, the forward voltage drop of the diode 53 becomes relatively less dependent (i.e. the line 61 becoming more horizontal) on the voltage Vout, in accordance with the diode characteristics. Consequently, the lines 60 and 61 cross, in this case at a value of the power supply output voltage Vout of about 1.8 volts.

Consequently, as the voltage Vout increases from zero, the diode 53 is forward biassed via the resistance 52 so that initially the input of the inverter 51 is more positive than its prevailing input logic threshold level. The inverter 51 thus produces a zero voltage at its output, which tri-states or disables the output of the amplifier 46 so that the MOSFET 25 can not be turned off at such low values of the output voltage Vout, regardless of any undefined behaviour of, for example, the bandgap voltage reference source 42.

When the power supply output voltage Vout rises above, in this example, about 1.8 volts, as shown in FIG. 6 the input logic threshold level of the inverter 51 rises to above the prevailing forward voltage drop of the diode 53, so that the output of the inverter 51 becomes high, i.e. equal to the supply voltage Vout of the inverter. Thus the output of the amplifier 46 is enabled, thereby ending the inhibit function represented by the switch 46 in FIG. 4, so that the circuit 43 operates as described above to control the depletion mode MOSFET 25. At these higher values of the power supply output voltage Vout the operation of the bandgap reference voltage source 42 and the circuit 43 is stable and well defined, so that proper start-up of the power supply arrangement is ensured.

The resistance 52 in the circuit of FIG. 5 can conveniently be constituted in known manner by a transistor of the IC, and the diode 53 can conveniently be constituted in known manner by a diode-connected transistor of the IC.

Figure 7:
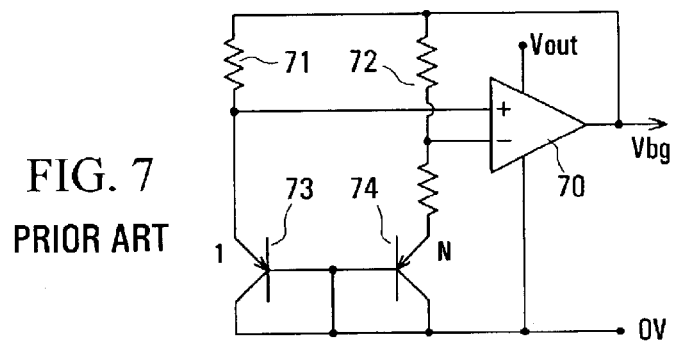
FIG. 7 schematically illustrates a known form of a bandgap voltage reference of the control unit of FIG. 4.

For completeness, FIG. 7 illustrates a known form of a bandgap voltage reference which may be used to constitute the source 42 in the control unit of FIG. 4. As illustrated, this comprises a differential amplifier 70, powered by the power supply output voltage Vout, whose output provides the bandgap voltage Vbg for the circuits 43 and 44 of the control unit 16. This output is also connected via respective resistive paths 71 and 72 to the emitters of diode-connected bipolar transistors 73 and 74 respectively which are proportioned in a ratio 1:N. The emitter of the transistor 73, and a tapping point in the resistive path 72 to the emitter of the transistor 74, are connected to the differential inputs of the amplifier 70. Such a bandgap voltage reference is typically designed to provide a bandgap voltage Vbg of about 1.2 volts which is relatively stable with changing temperature and supply voltage (above about 1.8 volts as discussed above).

Figure 8:
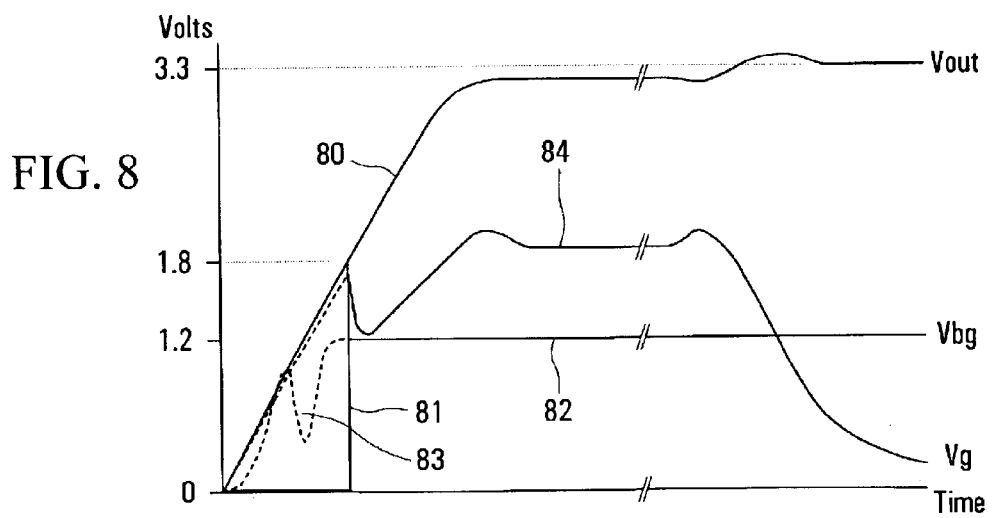
FIG. 8 is a graph illustrating operation of parts of the power supply arrangement of FIG. 3 using the control unit of FIG. 4.

FIG. 8 illustrates in a graph variation of various voltages of the control unit 16 as described above, on start-up of the power supply arrangement as the input voltage Vin rises from zero. A line 80 represents the output voltage Vout, which initially rises from zero in accordance with the rising input voltage Vin and the conductive state of the depletion mode MOSFET 25. When this output voltage Vout exceeds 1.8 volts, as described above the output of the inverter 51 rises from zero to Vout as shown by a line 81 in FIG. 8. Below this value of the output voltage Vout the output of the inverter 51 is zero, and above this value the output of the inverter 51 follows the output voltage Vout.

A line 82 in FIG. 8 represents the bandgap reference voltage of 1.2 volts produced by the source 42. For values of the output voltage Vout less than 1.8 volts this line 82 is shown dashed, to indicate that this reference voltage may be produced in an unstable or indefinite manner, for example as illustrated at 83 in FIG. 8. A line 84 in FIG. 8 represents a voltage Vg at the gate of the depletion mode MOSFET 25; for values of the output voltage Vout greater than 1.8 volts this voltage Vg is produced on the line 31 by the circuit 43. For lower values of the output voltage Vout this line 83 is shown dashed; at these lower values the voltage Vg may generally follow the output voltage Vout due to a resistor connection shown in FIG. 3 between the output voltage Vout and the gate of the transistor 25.

As shown in FIG. 8, as the output voltage Vout approaches about 3.2 volts the circuit 43, whose output is now enabled by the output of the inverter 51, starts to turn off the depletion mode MOSFET 25 so that the output voltage is regulated to about 3.2 volts and the voltage Vg is about 2 volts. Subsequently, as shown towards the right in FIG. 8, the flyback converter starts operating as described above and the output voltage Vout increases to its nominal value of 3.3 volts under the control of the circuit 44, and as a result the voltage Vg produced by the circuit 43 falls towards zero to turn off the depletion mode MOSFET 25 as described above.

It can be appreciated that instead of, or in addition to, controlling the output of the differential amplifier 46, a bias circuit for this amplifier can be controlled to break the feedback path via the circuit 43, and/or to disable the amplifier 43 and thereby reduce the load on the voltage Vout as it initially rises from zero.

Although the above description refers specifically to the reference voltage source 42 as being a bandgap voltage reference, it can be appreciated that any other form of reference voltage source, such as a zener diode or other diode arrangement, could instead be used. In addition, any desired form of control circuit could be provided instead of the control circuit constituted by the components 51 to 53 as described above, this may also be time-sensitive to mask out transient effects, and as indicated above the feedback path via the circuit 43 can be disabled in any other desired manner. In addition, the particular polarities, voltage values, and circuit connections of the control unit described above are given only by way of example and may be changed as desired.

Thus although particular embodiments of the invention are described above, it can be appreciated that numerous modifications, variations, and adaptations may be made without departing from the scope of the invention as defined in the claims.

What is claimed is:

1. A power supply arrangement comprising a power supply responsive to an input voltage for producing a controlled output voltage, the power supply including a control circuit powered by the output voltage of the power supply and responsive to differences between a voltage dependent upon the output voltage of the power supply and a reference voltage to control the power supply, wherein the control circuit is initially responsive to start-up of the power supply arrangement to inhibit control of the power supply responsive to said differences.

2. A power supply arrangement as claimed in claim 1 wherein the control circuit comprises a difference amplifier having an output for controlling the power supply to control said output voltage, the difference amplifier further having an input for disabling operation of the difference amplifier in dependence upon said output voltage of the power supply.

3. A power supply arrangement as claimed in claim 2 wherein the control circuit further comprises a diode arranged to be forward biassed via a resistance coupled to said output voltage, and a logic element responsive to a forward voltage drop of the diode to control said input for disabling operation of the difference amplifier.

4. A power supply arrangement as claimed in claim 3 wherein the logic element comprises an inverter to which said output voltage is provided as a supply voltage.

5. A power supply arrangement as claimed in claim 1 and comprising a bandgap voltage reference source powered by said output voltage of the power supply for providing the reference voltage.

6. A power supply arrangement as claimed in claim 1 wherein the power supply comprises a switch mode power supply having a start-up circuit for producing said output of the power supply prior to operation of the switch mode power supply, wherein the control circuit controls the start-up circuit and is initially responsive to start-up of the power supply arrangement to inhibit control of the start-up circuit.

7. A power supply arrangement as claimed in claim 6 wherein the start-up circuit comprises a transistor controlled by the control circuit and providing a controlled path between the input voltage and the output voltage of the power supply.

8. A power supply arrangement claimed in claim 7 wherein the control circuit is responsive to operation of the switch mode power supply to turn off the transistor of the start-up circuit.

9. In combination, a power supply arrangement as claimed in claim 1 and an electrical circuit powered by the output voltage of the power supply, wherein the electrical circuit comprises an integrated circuit and at least part of the control circuit of the power supply is included in said integrated circuit.

10. A power supply arrangement comprising:
   a switch mode power supply for producing a controlled output voltage from an input voltage;
   a control circuit powered by the output voltage and responsive to the output voltage to control the switch mode power supply; and
   a start-up circuit for producing said output voltage from the input voltage on start-up prior to operation of the switch mode power supply;
   wherein the control circuit comprises an amplifier responsive to differences between a voltage dependent upon the output voltage of the power supply and a reference voltage to produce an output for controlling the start-up circuit, and an inhibit circuit for inhibiting operation of the amplifier at low values of said output voltage.

11. A power supply arrangement as claimed in claim 10 wherein the control circuit comprises a bandgap voltage reference source powered by said output voltage of the power supply for providing the reference voltage.

12. A power supply arrangement as claimed in claim 10 wherein the inhibit circuit comprises a diode, a resistance via which the diode is forward biassed from said output voltage, and a logic element responsive to a forward voltage drop of the diode, relative to an input threshold voltage of the logic element which is dependent upon said output voltage, to inhibit operation of the amplifier at low values of said output voltage.

13. A power supply arrangement as claimed in claim 12 wherein the logic element comprises an inverter to which said output voltage is provided as a supply voltage.

14. A power supply arrangement as claimed in claim 10 wherein the start-up circuit comprises a transistor controlled by the control circuit and providing a controlled path between the input voltage and the output voltage of the power supply.

15. A power supply arrangement as claimed in claim 14 wherein the control circuit is arranged to control the switch mode power supply to produce a higher value of said output voltage than is produced by the start-up circuit and to turn off the transistor of the start-up circuit in response to said higher value of said output voltage.

16. In combination, a power supply arrangement as claimed in claim 10 and an electrical circuit powered by the output voltage of the power supply, wherein the electrical circuit comprises an integrated circuit and at least part of the control circuit of the power supply is included in said integrated circuit.

* * * * *